(12) United States Patent
Lu et al.

(10) Patent No.: US 10,247,884 B2
(45) Date of Patent: Apr. 2, 2019

(54) METHOD AND APPARATUS FOR OPTICAL FIBER CONNECTION

(71) Applicant: ASML HOLDING N.V., Veldhoven (NL)

(72) Inventors: Louis Zhongliang Lu, Southbury, CT (US); Tao Chen, New City, NY (US); Francisco Javier Berrios, Trumbull, CT (US); Jiazong Zhang, Norwalk, CT (US)

(73) Assignee: ASML Holding N.V., Veldhoven (NL)

( * ) Notice: Subject to any disclaimer, the term of this patent is extended or adjusted under 35 U.S.C. 154(b) by 0 days.

(21) Appl. No.: 15/562,883

(22) PCT Filed: Apr. 11, 2016

(86) PCT No.: PCT/EP2016/057910
§ 371 (c)(1),
(2) Date: Sep. 28, 2017

(87) PCT Pub. No.: WO2016/166055
PCT Pub. Date: Oct. 20, 2016

(65) Prior Publication Data
US 2018/0113257 A1  Apr. 26, 2018

Related U.S. Application Data

(60) Provisional application No. 62/149,328, filed on Apr. 17, 2015, provisional application No. 62/148,607, filed on Apr. 16, 2015.

(51) Int. Cl.
*G02B 6/02* (2006.01)
*G02B 6/26* (2006.01)
(Continued)

(52) U.S. Cl.
CPC ......... *G02B 6/262* (2013.01); *G02B 6/02295* (2013.01); *G02B 6/32* (2013.01); *G02B 6/4225* (2013.01)

(58) Field of Classification Search
CPC ...... G02B 6/02295; G02B 6/262; G02B 6/32; G02B 6/4225
(Continued)

(56) References Cited

U.S. PATENT DOCUMENTS 3,864,019 A * 2/1975 Smolinsky ............. G02B 6/262
385/49
4,733,936 A 3/1988 Mikolaicyk et al.
(Continued)

FOREIGN PATENT DOCUMENTS

CN   1916603    2/2007
EP   1 199 582  4/2002
(Continued)

OTHER PUBLICATIONS

"Spot-size Expanded High Efficiency 1.3um MQW Laser Diodes with Laterally Tapered Active Stripe" Uda et al., IEEE; Jul. 1997; pp. 657-660.*
(Continued)

*Primary Examiner* — Michael P Mooney
(74) *Attorney, Agent, or Firm* — Pillsbury Winthrop Shaw Pittman LLP

(57) ABSTRACT

A system including a first component having a lensed facet; and a second component optically coupled to the first component, the second component having a tapered facet, the tapered facet and lensed facet spaced from each other so as to establish evanescent-wave coupling between the first component and the second component.

23 Claims, 7 Drawing Sheets

(51) Int. Cl.
*G02B 6/32* (2006.01)
*G02B 6/42* (2006.01)

(58) Field of Classification Search
USPC .................. 385/27–28, 30–31, 39, 43, 123
See application file for complete search history.

(56) References Cited

U.S. PATENT DOCUMENTS

| | | | | |
|---|---|---|---|---|
| 4,812,020 | A * | 3/1989 | Endo | G11B 7/0901 |
| | | | | 359/641 |
| 5,446,816 | A * | 8/1995 | Shiraishi | G02B 6/2552 |
| | | | | 385/33 |
| 6,081,355 | A * | 6/2000 | Sharma | H04B 10/2572 |
| | | | | 398/1 |
| 7,791,732 | B2 | 9/2010 | Den Boef et al. | |
| 8,508,736 | B2 | 8/2013 | Den Boef et al. | |
| 8,526,110 | B1 * | 9/2013 | Honea | H01S 3/06791 |
| | | | | 359/556 |
| 8,797,554 | B2 | 8/2014 | Straaijer | |
| 2003/0053751 | A1 | 3/2003 | Ukrainczyk | G02B 6/2552 |
| | | | | 385/33 |
| 2006/0066855 | A1 | 3/2006 | Den Boef et al. | |
| 2007/0237453 | A1 | 10/2007 | Nielsen et al. | |
| 2007/0263973 | A1 * | 11/2007 | Van Laere | G02B 6/124 |
| | | | | 385/129 |
| 2008/0197285 | A1 | 8/2008 | Frey et al. | |
| 2009/0034562 | A1 * | 2/2009 | Nicholson | G02F 1/365 |
| | | | | 372/6 |
| 2009/0097008 | A1 | 4/2009 | Mos et al. | |
| 2010/0086256 | A1 | 4/2010 | Ben Bakir et al. | |
| 2011/0085726 | A1 | 4/2011 | Den Boef et al. | |
| 2012/0076465 | A1 * | 3/2012 | Chen | G02B 6/1228 |
| | | | | 385/124 |
| 2012/0195554 | A1 | 8/2012 | Maack | |
| 2012/0212718 | A1 * | 8/2012 | Den Boef | G02B 21/0048 |
| | | | | 355/67 |
| 2013/0308142 | A1 | 11/2013 | Straaijer | |
| 2014/0177995 | A1 * | 6/2014 | Mohammed | G02B 6/36 |
| | | | | 385/14 |

FOREIGN PATENT DOCUMENTS

| | | |
|---|---|---|
| GB | 1 541 787 | 3/1979 |
| JP | 55153384 | 11/1980 |
| JP | 837330 | 2/1996 |
| JP | 9127360 | 5/1997 |
| JP | 10221547 | 8/1998 |
| JP | 2001235638 | 8/2001 |
| JP | 2008546039 | 12/2008 |
| JP | 200994512 | 4/2009 |
| JP | 2010245535 | 10/2010 |
| KR | 10-0720846 | 5/2007 |
| TW | 200630653 | 9/2006 |
| WO | 00/49435 | 8/2000 |

OTHER PUBLICATIONS

McNab et al., "Ultra-low loss photonic integrated circuit with membrane-type photonic crystal waveguides", Optic Express 11 (22), 2927 (2003)].*
Almeida et al. "Nanotaper for compact mode conversion," Opt. Lett. 28, 1302 (2002).*
Taiwan Office Action dated Feb. 23, 2017 in corresponding Taiwan Patent Application No. 105111692.
International Search Report and Written Opinion dated Jun. 27, 2016 in corresponding International Patent Application No. PCT/EP2016/057910.
Lauvernier, D. et al., "Optical devices for ultra-compact photonic integrated circuits based on III-V/polymer nanowires", Optics Express, vol. 15, No. 9, pp. 5333-5341 (2007).
Kong, Gyeong-Jun et al., "Lensed photonic crystal fiber obtained by use of an arc discharge", Optics Express, vol. 31, No. 7, pp. 894-896 (2006).
Japanese Office Action issued in corresponding Japanese Patent Application No. 2017-554291, dated Nov. 6, 2018.

* cited by examiner

METHOD AND APPARATUS FOR OPTICAL FIBER CONNECTION

CROSS-REFERENCE TO RELATED APPLICATIONS

This application is the U.S. national phase entry of PCT patent application no. PCT/EP2016/057910, which was filed on Apr. 11, 2016, which claims the benefit of priority of U.S. provisional application No. 62/148,607, which was filed on Apr. 16, 2015, and U.S. provisional application No. 62/149,328, which was filed on Apr. 17, 2015, and which applications are incorporated herein in its entirety by reference.

FIELD

The present description relates to methods and apparatus to connect optical fiber.

BACKGROUND

Whether in lithographic or other processes, it is desirable to make inspections or measurements using an optical detection measuring technique. Further, it is desirable to use radiation in other processes such irradiation of surfaces, in telecommunications, etc.

To at least facilitate transport of the radiation, optical fiber may be used. An optical fiber is a waveguide (typically cylindrical) that transmits radiation along its axis. The fiber typically comprises a core (usually in the middle) surrounded by a "cladding" layer. The fiber may be made entirely from solid transparent materials such as glass; the core and "cladding" layer are typically made of dielectric material. The transparent material in one part (usually the middle) of the cross-section of the fiber has a different optical structure, e.g., higher refractive index, than the rest and forms the core within which the radiation is guided by, e.g., total internal reflection. The boundary between the core and "cladding" layer may be abrupt, in, e.g., step-index fiber, or gradual, in, e.g., graded-index fiber. The optical fiber may be single mode or multi-mode, wherein a main difference between multi-mode and single-mode optical fiber is that the former has a significantly larger core cross-wise dimension (e.g., width or diameter) e.g., typically 50-100 micrometers, while the latter typically has a core cross-wise dimension less than about ten times the wavelength of the propagating radiation, e.g., 8 and 10.5 μm.

A photonic-crystal fiber (PCF) is a special form of optical fiber. PCF can come in variety of forms and are based on the properties of photonic crystals (although the fiber itself need not have a crystal material). An example of PCF comprises a single solid, and substantially transparent, material, such as fused silica glass, within which is embedded a periodic array of open holes, running parallel to the fiber axis. A "defect" in the form of a single missing hole within the regular array forms a region of raised refractive index, which acts as a waveguiding fiber core within which radiation is guided, in a manner analogous to total-internal-reflection guiding in standard fibers. Another mechanism for guiding radiation is based on photonic-band-gap effects. Photonic-band-gap guidance can be obtained by suitable design of the array of holes.

SUMMARY

It may be desirable to provide a connection by which portions of optical fiber are at least optically coupled to each other or by which optical fiber is at least optically coupled to another component. In particular, it desirable to provide a connection that provides high coupling efficiency, stability and/or doesn't require special alignment. In an embodiment, it may be desirable to enable to such a connection for optically coupling PCF to PCF.

In an embodiment, there is provided a system, comprising: a first component comprising a lensed facet; and a second component optically coupled to the first component, the second component comprising a tapered facet, the tapered facet and lensed facet spaced from each other so as to establish evanescent-wave coupling between the first component and the second component.

In an embodiment, there is provided a method of optically coupling optical components, the method comprising: propagating evanescent waves of radiation across a gap between a lensed facet of a first optical component and a tapered facet of a second optical component.

In an embodiment, there is provided a spectrally broadened radiation apparatus, comprising: a laser configured to emit, through an output of the laser, radiation; an optical fiber optically coupled to the output of the laser, the optical fiber having an input to receive the radiation from the laser and having an output to provide spectrally broadened output radiation, the optical fiber configured to spectrally broaden the radiation from the laser to a spectral width of at least 0.5 nm around the nominal wavelength; and a system as described herein.

In an embodiment, there is provided an inspection apparatus, comprising: a radiation apparatus configured to provide radiation; an output to provide the radiation from the radiation apparatus onto a diffraction target; a detector configured to receive diffracted radiation from the target; and a system as described herein. In an embodiment, the detector is configured to determine alignment of two or more objects responsive to the received diffracted radiation.

In an embodiment, there is provided an alignment sensor, comprising: an output to provide the radiation from the radiation apparatus onto a target; a detector configured to receive radiation from the target; a control system configured to determine alignment of two or more objects responsive to the received radiation; and a system as described herein.

BRIEF DESCRIPTION OF THE DRAWINGS

Embodiments will now be described, by way of example only, with reference to the accompanying drawings in which.

DETAILED DESCRIPTION

Before describing embodiments in detail, it is instructive to present an example environment in which embodiments may be implemented.

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g., including part of, one, or several dies) on a substrate (e.g., a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the substrate parallel or anti parallel to this direction. It is also possible to transfer the pattern from the patterning device to the substrate by imprinting the pattern onto the substrate.

Figure 1:
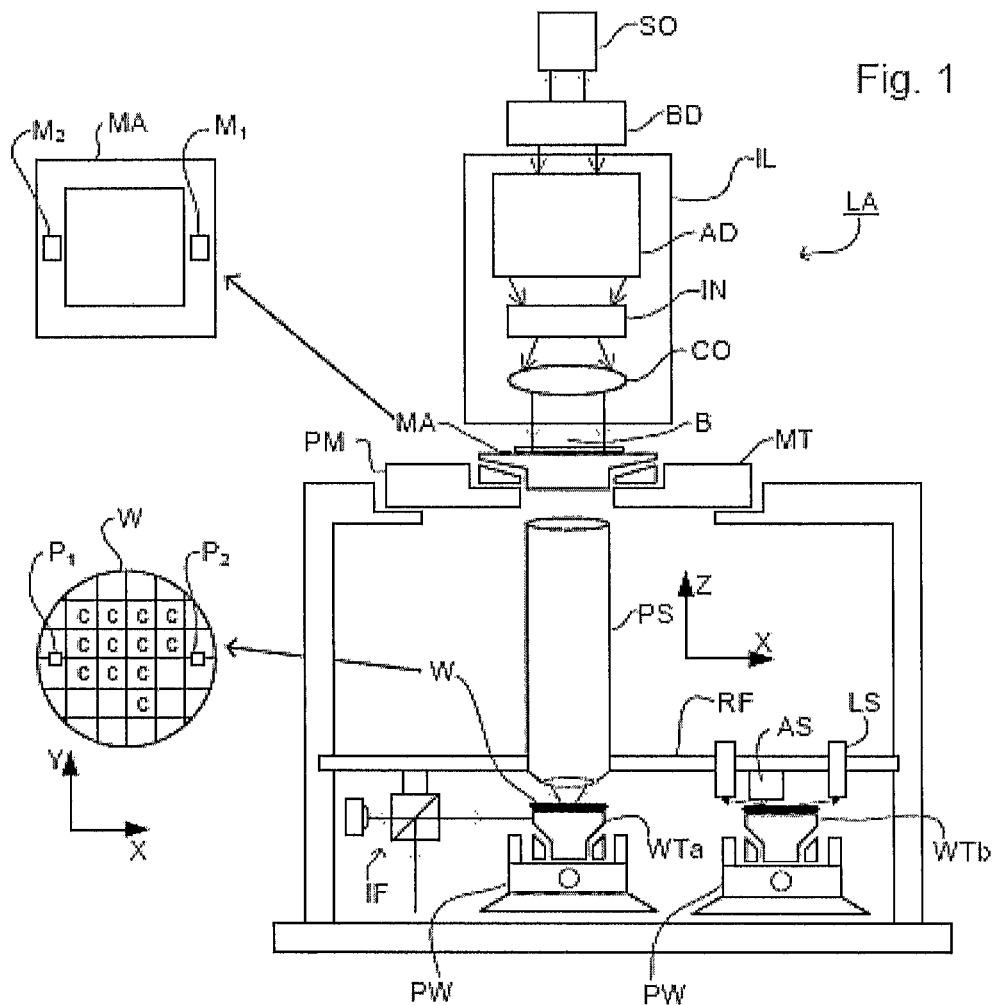
FIG. 1 schematically depicts an embodiment of a lithographic apparatus.

FIG. 1 schematically depicts a lithographic apparatus LA. The apparatus comprises:

- an illumination system (illuminator) IL configured to condition a radiation beam B (e.g. DUV radiation or EUV radiation);
- a support structure (e.g. a mask table) MT constructed to support a patterning device (e.g. a mask) MA and connected to a first positioner PM configured to accurately position the patterning device in accordance with certain parameters;
- a substrate table (e.g. a wafer table) WTa constructed to hold a substrate (e.g. a resist-coated wafer) W and connected to a second positioner PW configured to accurately position the substrate in accordance with certain parameters; and
- a projection system (e.g. a refractive projection lens system) PS configured to project a pattern imparted to the radiation beam B by patterning device MA onto a target portion C (e.g. comprising one or more dies) of the substrate W.

The illumination system may include various types of optical components, such as refractive, reflective, magnetic, electromagnetic, electrostatic or other types of optical components, or any combination thereof, for directing, shaping, or controlling radiation.

The patterning device support structure holds the patterning device in a manner that depends on the orientation of the patterning device, the design of the lithographic apparatus, and other conditions, such as for example whether or not the patterning device is held in a vacuum environment. The patterning device support structure can use mechanical, vacuum, electrostatic or other clamping techniques to hold the patterning device. The patterning device support structure may be a frame or a table, for example, which may be fixed or movable as required. The patterning device support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam, which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g., employing a transmissive mask). Alternatively, the apparatus may be of a reflective type (e.g., employing a programmable mirror array of a type as referred to above, or employing a reflective mask).

The lithographic apparatus may be of a type having two (dual stage) or more tables (e.g., two or more substrate table, two or more patterning device support structures, or a substrate table and metrology table). In such "multiple stage" machines the additional tables may be used in parallel, or preparatory steps may be carried out on one or more tables while one or more other tables are being used for exposure.

The lithographic apparatus may also be of a type wherein at least a portion of the substrate may be covered by a liquid having a relatively high refractive index, e.g., water, so as to fill a space between the projection system and the substrate. An immersion liquid may also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD including, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may include an adjuster AD for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may include various other components, such as an integrator IN and a condenser CO. The illuminator may be used to condition the radiation beam, to have a desired uniformity and intensity distribution in its cross section.

The radiation beam B is incident on the patterning device (e.g., mask) MA, which is held on the patterning device support (e.g., mask table) MT, and is patterned by the patterning device. Having traversed the patterning device (e.g., mask) MA, the radiation beam B passes through the projection system PS, which focuses the beam onto a target portion C of the substrate W. With the aid of the second positioner PW and position sensor IF (e.g., an interferometric device, linear encoder, 2-D encoder or capacitive sensor), the substrate table WTa can be moved accurately, e.g., so as to position different target portions C in the path of the radiation beam B. Similarly, the first positioner PM and another position sensor (which is not explicitly depicted in FIG. 1) can be used to accurately position the patterning device (e.g., mask) MA with respect to the path of the radiation beam B, e.g., after mechanical retrieval from a mask library, or during a scan. In general, movement of the patterning device support (e.g., mask table) MT may be realized with the aid of a long-stroke module (coarse positioning) and a short-stroke module (fine positioning), which form part of the first positioner PM. Similarly, movement of the substrate table WTa may be realized using a long-stroke module and a short-stroke module, which form part of the second positioner PW. In the case of a stepper (as opposed to a scanner) the patterning device support (e.g., mask table) MT may be connected to a short-stroke actuator only, or may be fixed.

Patterning device (e.g., mask) MA and substrate W may be aligned using patterning device alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the patterning device (e.g., mask) MA, the patterning device alignment marks may be located between the dies. Small alignment markers may also be included within dies, in amongst the device features, in which case it is desirable that the markers be as small as possible and not require any different imaging or process conditions than adjacent features. The alignment system, which detects the alignment markers, is described further below.

Lithographic apparatus LA may be a so-called multi-stage type which has two or more tables WTa, WTb (e.g., two substrate tables) and two or more stations—an exposure station and a measurement station—between which the tables can be exchanged. For example, while a substrate on one table is being exposed at the exposure station, another substrate can be loaded onto the other substrate table at the measurement station and various preparatory steps carried out. The preparatory steps may include mapping the surface control of the substrate using a level sensor LS and measuring the position of alignment markers on the substrate using an alignment sensor AS, both sensors being supported by a reference frame RF. If the position sensor IF is not capable of measuring the position of a table while it is at the measurement station as well as at the exposure station, a second position sensor may be provided to enable the positions of the table to be tracked at both stations. As another example, while a substrate on one table is being exposed at the exposure station, another table without a substrate waits at the measurement station (where optionally measurement activity may occur). This other table has one or more measurement devices and may optionally have other tools (e.g., cleaning apparatus). When the substrate has completed exposure, the table without a substrate moves to the exposure station to perform, e.g., measurements and the table with the substrate moves to a location (e.g., the measurement station) where the substrate is unloaded and another substrate is load. These multi-table arrangements enable a substantial increase in the throughput of the apparatus.

Figure 2:
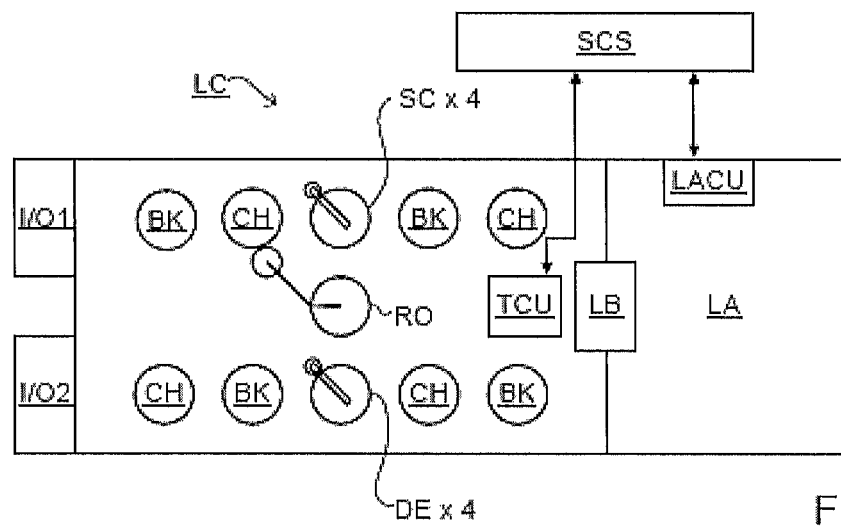
FIG. 2 schematically depicts an embodiment of a lithographic cell or cluster.

As shown in FIG. 2, the lithographic apparatus LA forms part of a lithographic cell LC, also sometimes referred to as a lithocell or lithocluster, which also includes apparatus to perform one or more pre- and post-exposure processes on a substrate. Conventionally these include one or more spin coaters SC to deposit a resist layer, one or more developers DE to develop exposed resist, one or more chill plates CH and one or more bake plates BK. A substrate handler, or robot, RO picks up a substrate from input/output ports I/O1, I/O2, moves it between the different process devices and delivers it to the loading bay LB of the lithographic apparatus. These devices, which are often collectively referred to as the track, are under the control of a track control unit TCU which is itself controlled by the supervisory control system SCS, which also controls the lithographic apparatus via lithographic control unit LACU. Thus, the different apparatus may be operated to maximize throughput and processing efficiency.

So, with the aid of a lithographic apparatus, different patterns are successively imaged at a precisely aligned position onto the substrate. The substrate may undergo physical and chemical changes between the successive images that have been aligned with each other. The substrate is removed from the apparatus after it has been exposed with the image of at least one pattern, and, after it has undergone the desired process steps, the substrate is placed back in order to expose it with an image of a further pattern, and so forth, while it must be ensured that the images of the further pattern and any subsequent patterns are positioned accurately with respect to the at least one already exposed image on the substrate. To this end, the substrate (and/or a substrate table and/or the patterning device) may be provided with alignment marks to provide a reference location on the substrate, and the lithographic apparatus is provided with an alignment system to measure the alignment position of the alignment marks. By measuring the alignment position of the alignment marks, in principle the position of every point on the substrate can be predicted, i.e., the location of a previously exposed target portion can be calculated and the lithographic apparatus can be controlled to expose a successive target portion on top of the previously exposed target portion.

Usually, the alignment marks on the substrate are diffraction structures such as diffraction gratings. The alignment system then comprises an alignment sensor system with a radiation source to emit radiation towards the grating and a detector to detect the diffraction pattern in the reflected radiation, i.e., sub-beams diffracted in a first, third and/or higher order are used, in order to determine the position of the grating.

Further, in order that the substrate that is exposed by the lithographic apparatus is exposed correctly and consistently, it is desirable to inspect an exposed substrate to, e.g., make measurements of the structures created (e.g., the device features in resist and/or other layer on or of the substrate), e.g., for process control and verification. One or more parameters of the structures are typically measured or determined, for example the critical dimension (CD) of structures, overlay error between subsequent layers formed in or on the substrate, line thickness, etc. If an error is detected, an adjustment may be made to an exposure of one or more subsequent substrates, especially if the inspection can be done soon and fast enough that another substrate of the same batch is still to be exposed. Also, an already exposed substrate may be stripped and reworked (to improve yield) or discarded, thereby avoiding performing an exposure on a substrate that is known to be faulty. In a case where only some target portions of a substrate are faulty, a further exposure may be performed only on those target portions which are good. Another possibility is to adapt a setting of a subsequent process step to compensate for the error, e.g. the time of a trim etch step can be adjusted to compensate for substrate-to-substrate CD variation resulting from the lithographic process step.

An inspection apparatus is used to determine one or more properties of a substrate, and in particular, how one or more properties of different substrates or different layers of the same substrate vary from layer to layer and/or across a substrate. There are various techniques for making measurements of the microscopic structures formed in a lithographic process.

Various tools for making such measurements are known, including scanning electron microscopes, which are often used to measure critical dimension (CD), and specialized tools to measure overlay, the accuracy of alignment of two layers in a device. An example of such a tool is a scatterometer developed for use in the lithographic field. This device directs a beam of radiation onto a target on the surface of the substrate and measures one or more properties of the redirected radiation—e.g., intensity at a single angle of reflection as a function of wavelength; intensity at one or more wavelengths as a function of reflected angle; or polarization as a function of reflected angle—to obtain a "spectrum" from which a property of interest of the target can be determined. Determination of the property of interest may be performed by various techniques: e.g., reconstruction of the target structure by iterative approaches such as rigorous coupled wave analysis or finite element methods, library searches, and principal component analysis. Like with alignment, the target may be a diffraction grating, e.g., typically a compound grating of a grating in one layer overlaid by another grating in another layer.

The inspection apparatus may be integrated into the lithographic apparatus LA or the lithocell LC or may be a stand-alone device. To enable most rapid measurements, it is desirable that the inspection apparatus measure one or more properties in the exposed resist layer immediately after the exposure. However, the latent image in the resist has a very low contrast—there is only a very small difference in refractive index between the part of the resist which has been exposed to radiation and that which has not—and not all inspection apparatus have sufficient sensitivity to make useful measurements of the latent image. Therefore measurements may be taken after the post-exposure bake step (PEB) which is customarily the first step carried out on an exposed substrate and increases the contrast between exposed and unexposed parts of the resist. At this stage, the image in the resist may be referred to as semi-latent. It is also possible to make measurements of the developed resist image—at which point either the exposed or unexposed parts of the resist have been removed—or after a pattern transfer step such as etching. The latter possibility limits the possibility for rework of a faulty substrate but may still provide useful information, e.g. for the purpose of process control.

Figure 3:
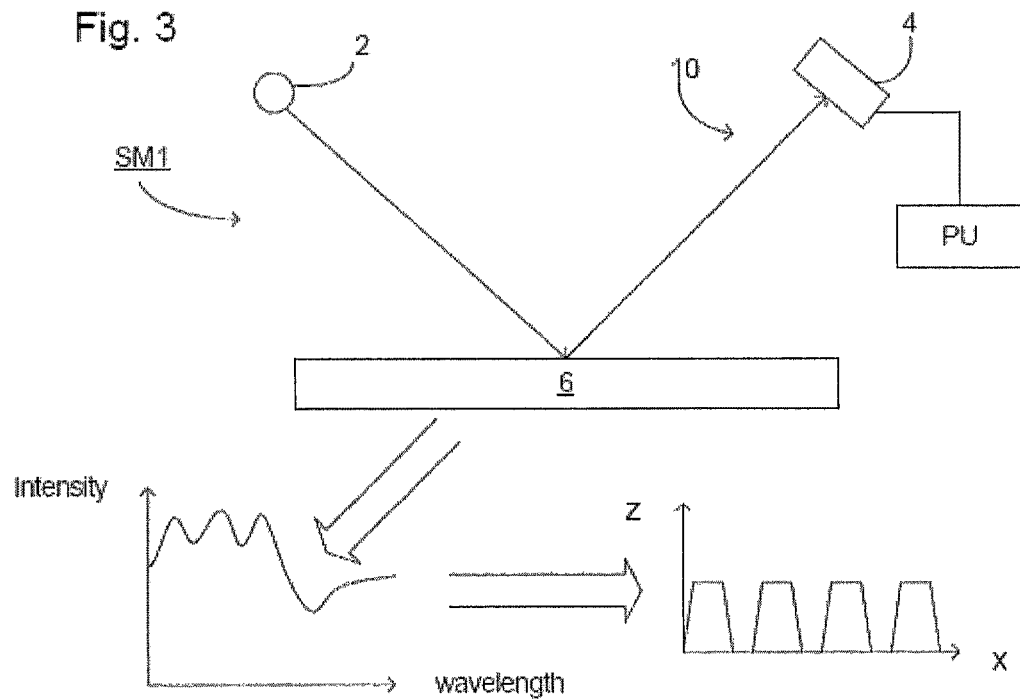
FIG. 3 schematically depicts an embodiment of an inspection apparatus.

FIG. 3 depicts an embodiment of an inspection apparatus SM1. It comprises a radiation projector 2 (e.g. broadband (white light) radiation projector) which projects radiation onto a target (e.g., a diffracting grating) of a substrate 6. The reflected radiation is passed to a detector 4 (e.g., spectrometer detector), which, in this case, measures a spectrum 10 (i.e. a measurement of intensity as a function of wavelength) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 3. In general, for the reconstruction, the general form of the structure is known and some parameters are assumed from knowledge of the process by which the structure was made, leaving only a few parameters of the structure to be determined from the data. Such an inspection apparatus may be configured for normal-incidence or oblique-incidence.

Figure 4:
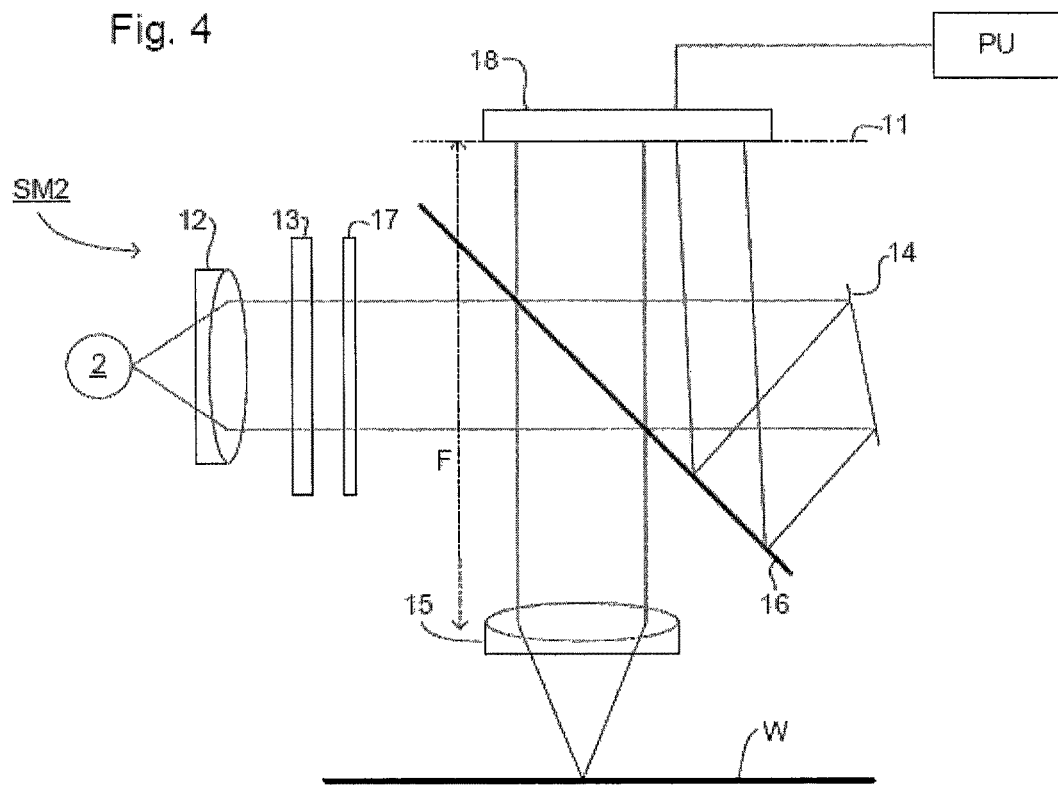
FIG. 4 schematically depicts a further embodiment of an inspection apparatus.

Another embodiment of an inspection apparatus SM2 is shown in FIG. 4. In this device, the radiation emitted by radiation source 2 is focused using lens system 12 through interference filter 13 and polarizer 17, reflected by partially reflective surface 16 and is focused onto a target of substrate W via an objective lens 15, which has a high numerical aperture (NA), desirably at least 0.9 or at least 0.95. An immersion measurement (using liquid between the lens 15 and the substrate W) may even have a lens with a numerical aperture over 1. The reflected radiation then transmits through partially reflective surface 16 into a detector 18 in order to have the scattered radiation detected. The detector may be located in the back-projected pupil plane 11, which is at the focal length of the lens 15, however the pupil plane may instead be re-imaged with auxiliary optics (not shown) onto the detector 18. The pupil plane is the plane in which the radial position of radiation defines the angle of incidence and the angular position defines the azimuth angle of the radiation. The detector is, for example, a two-dimensional detector so that a two-dimensional angular scatter spectrum (i.e. a measurement of intensity as a function of angle of scatter) of the substrate target can be measured. The detector 18 may be, for example, an array of CCD or CMOS sensors, and may have an integration time of, for example, 40 milliseconds per frame.

A reference beam is often used, for example, to measure the intensity of the incident radiation. To do this, when the radiation beam is incident on the partially reflective surface 16 part of it is transmitted through the surface as a reference beam towards a reference mirror 14. The reference beam is then projected onto a different part of the same detector 18.

One or more interference filters 13 are available to select a wavelength of interest in the range of, say, 405-790 nm or even lower, such as 200-300 nm. The interference filter(s) may be tunable rather than comprising a set of different filters. A grating could be used instead of or in addition to one or more interference filters.

The detector 18 may measure the intensity of scattered radiation at a single wavelength (or narrow wavelength range), the intensity separately at multiple wavelengths or the intensity integrated over a wavelength range. Further, the detector may separately measure the intensity of transverse magnetic-(TM) and transverse electric-(TE) polarized radiation and/or the phase difference between the transverse magnetic- and transverse electric-polarized radiation.

Using a broadband radiation source 2 (i.e. one with a wide range of radiation frequencies or wavelengths—and therefore of colors) is possible, which gives a large etendue, allowing the mixing of multiple wavelengths. The plurality of wavelengths in the broadband desirably each has a bandwidth of $\delta\lambda$ and a spacing of at least $2\delta\lambda$ (i.e. twice the wavelength bandwidth). Several "sources" of radiation may be different portions of an extended radiation source which have been split using, e.g., fiber bundles. In this way, angle resolved scatter spectra may be measured at multiple wavelengths in parallel. A 3-D spectrum (wavelength and two different angles) may be measured, which contains more information than a 2-D spectrum. This allows more information to be measured which increases metrology process robustness. This is described in more detail in U.S. patent application publication no. US 2006-0066855, which document is hereby incorporated in its entirety by reference.

By comparing one or more properties of the beam before and after it has been redirected by the target, one or more properties of the substrate may be determined. This may be done, for example, by comparing the redirected beam with theoretical redirected beams calculated using a model of the substrate and searching for the model that gives the best fit between measured and calculated redirected beams. Typically a parameterized generic model is used and the parameters of the model, for example width, height and sidewall angle of the pattern, are varied until the best match is obtained.

A spectroscopic-type of such an inspection apparatus directs a broadband radiation beam onto the substrate and measures the spectrum (intensity as a function of wavelength) of the radiation scattered into a particular narrow angular range. An angularly resolved-type of such an inspection apparatus uses a monochromatic radiation beam and measures the intensity (or intensity ratio and phase difference in case of an ellipsometric configuration) of the scattered radiation as a function of angle. Alternatively, measurement signals of different wavelengths may be measured separately and combined at an analysis stage. Polarized radiation may be used to generate more than one spectrum from the same substrate.

In order to determine one or more parameters of the substrate, a best match is typically found between the theoretical spectrum produced from a model of the substrate and the measured spectrum produced by the redirected beam as a function of either wavelength (spectroscopic-type apparatus) or angle (angularly resolved-type apparatus). To find the best match there are various methods, which may be combined. For example, a first method is an iterative search method, where a first set of model parameters is used to calculate a first spectrum, a comparison being made with the measured spectrum. Then a second set of model parameters is selected, a second spectrum is calculated and a comparison of the second spectrum is made with the measured spectrum. These steps are repeated with the goal of finding the set of parameters that gives the best matching spectrum. Typically, the information from the comparison is used to steer the selection of the subsequent set of parameters. This process is known as an iterative search technique. The model with the set of parameters that gives the best match is considered to be the best description of the measured substrate. A second method is to make a library of spectra, each spectrum corresponding to a specific set of model parameters. Typically the sets of model parameters are chosen to cover all or almost all possible variations of substrate properties. The measured spectrum is compared to the spectra in the library. Similarly to the iterative search method, the model with the set of parameters corresponding to the spectrum that gives the best match is considered to be the best description of the measured substrate. Interpolation techniques may be used to determine more accurately the best set of parameters in this library search technique.

In any method, sufficient data points (wavelengths and/or angles) in the calculated spectrum should be used in order to enable an accurate match, typically between 80 up to 800 data points or more for each spectrum. Using an iterative method, each iteration for each parameter value would involve calculation at 80 or more data points. This is multiplied by the number of iterations needed to obtain the correct profile parameters. Thus many calculations may be required. In practice this leads to a compromise between accuracy and speed of processing. In the library approach, there is a similar compromise between accuracy and the time required to set up the library.

In any of the apparatus described herein, the target on substrate W may be a grating which is printed such that after development, the bars are formed of solid resist lines. The bars may alternatively be etched into the substrate.

In an embodiment, the target pattern is chosen to be sensitive to a parameter of interest, such as focus, dose, overlay, chromatic aberration in the lithographic projection apparatus, etc., such that variation in the relevant parameter will manifest as variation in the printed target. For example, the target pattern may be sensitive to chromatic aberration in the lithographic projection apparatus, particularly the projection system PL, and illumination symmetry and the presence of such aberration will manifest itself in a variation in the printed target pattern. Accordingly, the measured data of the printed target pattern is used to reconstruct the target pattern. The parameters of the target pattern, such as line width and shape, may be input to the reconstruction process, performed by a processing unit PU, from knowledge of the printing step and/or other processes.

Other types of inspection or metrology apparatus may be used in an embodiment. For example, a dark field metrology apparatus such as described in U.S. Patent Application Publication No. 2013-0308142, which is incorporated herein in its entirety by reference, may be used. Further, those other types of metrology apparatus may use a completely different technique than as described herein.

And while examples of an inspection apparatus have been described, an alignment apparatus operates on similar principles of providing radiation from a source onto a target (e.g., an alignment grating), detecting diffracted radiation using a detector and analyzing the detected radiation to determine alignment.

Figure 5:
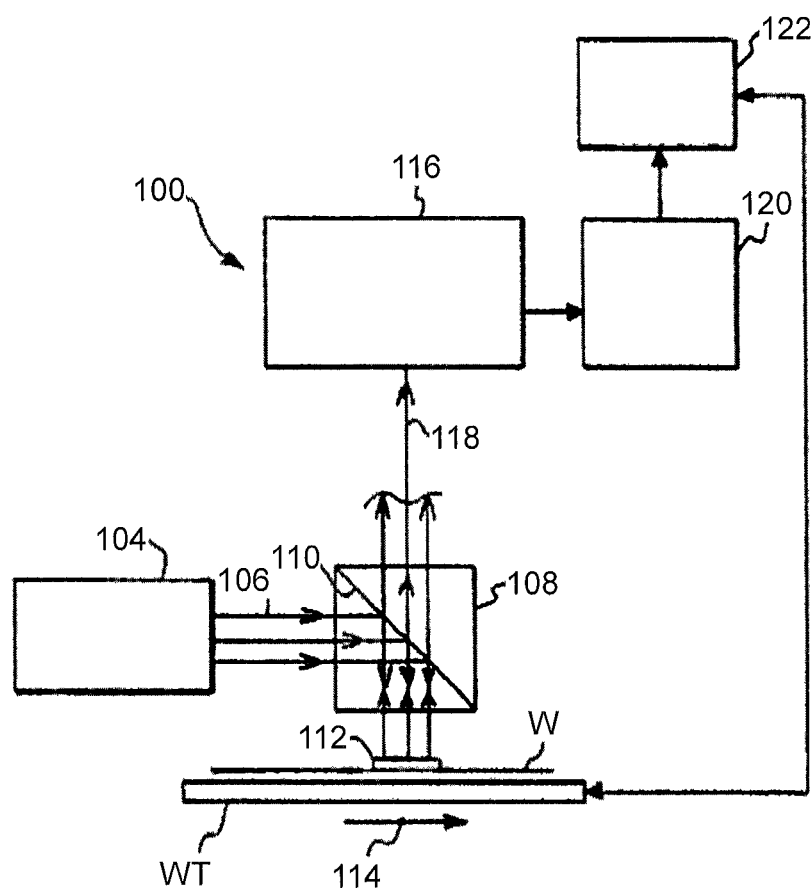
FIG. 5 schematically depicts an alignment sensor apparatus.

FIG. 5 is a schematic diagram illustrating an example alignment system 100. The alignment system 100 comprises a coherent illumination system 104, such as a laser, providing electromagnetic radiation 106, to a prism 108. At least a portion of the electromagnetic radiation is reflected off coating 110 to illuminate an alignment mark or target 112. The alignment mark or target 112 may have one hundred and eighty degree symmetry. By one hundred and eighty degree symmetry, it is meant that when the alignment mark 112 (also referred to as a "target") is rotated one hundred and eighty degree about an axis of symmetry perpendicular to the plane of the alignment mark 112, the alignment mark is substantially identical to the unrotated alignment mark. The axis for which this is true is called the axis of symmetry. The alignment mark 112 is placed on a substrate or wafer W that may be coated with a radiation-sensitive film.

The substrate W is placed on a substrate table WT. The substrate table WT may be scanned in the direction indicated by arrow 114. Electromagnetic radiation reflected from the alignment mark 112 passes through the prism 108 and is collected by an image rotation interferometer 116. It should be appreciated that a good quality image need not be formed, but that the features of the alignment mark should be resolved. The image rotation interferometer 116 may be any appropriate set of optical-elements, and is, in an embodiment, a combination of prisms, that form two images of the alignment mark, rotate one of the images with respect to the other one hundred and eighty degrees and then recombines the two images interferometrically so that when aligned with the alignment target 112, the electromagnetic radiation will interfere either in a polarization sense or in an amplitude sense, constructively or destructively, making readily detectable the center of the alignment mark 112. The optical ray passing through the center of rotation established by the interferometer, 116, defines the sensor alignment axis 118.

A detector 120 receives the electromagnetic radiation from the image rotation interferometer 116. The detector 120 then provides one or more signals to the signal analyzer 122. The signal analyzer 122 is coupled to the substrate table WT or its position sensor IF such that the position of the substrate table WT is known when the center of alignment mark 112 is determined. Therefore, the position of the alignment mark 112 is very accurately known with reference to the substrate table WT. Alternatively, the location of the alignment sensor 100 may be known such that the center of the alignment mark 112 is known with reference to the alignment sensor 100. Accordingly, the exact location of the center of the alignment target 112 is known relative to a reference position.

In an embodiment, the illumination system 104 may comprises a 4-color laser module assembly (LMA) and a polarized multiplexer (PMUX). The LMA is configured to generate four distinct lasers. For example, LMA 30 may generate a 532 nm green wavelength, a 633 nm red wavelength, a 780 nm near infrared wavelength and an 850 nm far infrared wavelength beam of radiation. The polarized multiplexer is configured to multiplex the four laser beams generated by the LMA into a single polarized beam that serves as the illumination source for alignment system 100. Instead of the construction of the illumination system 104 just described, the illumination system 104 may have a different construction as described herein.

Figure 6:
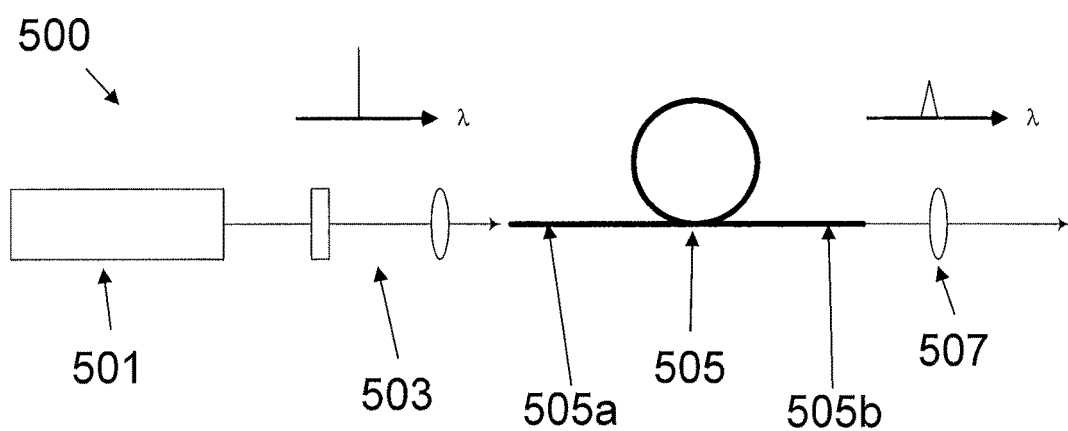
FIG. 6 schematically depicts an embodiment of a short coherence length radiation system in the visible region of the electromagnetic spectrum.

For example, many optical systems (e.g., lithography alignment and/or overlay sensors) benefit from high brightness radiation that has a broad spectral width and short coherent length. FIG. 6 schematically depicts an embodiment of a short coherence length, broad spectral width radiation system 500. System 500 includes a visible (e.g., green) laser 501 providing an input radiation to an input end 505*a* of an optical fiber 505 via one or more optical elements 503 including for example, but not limited to, a collimator, an attenuator, and/or a coupling lens. Output radiation is obtained at an output end 505*b* of optical fiber 505. The output radiation is then provided to output optics 507 which may include, for example, a collimator, a lens, a prism, a grating, an etalon, a spectral filter, or other optical element. In an embodiment, wavelength sensitive optics, such as a spectral filter, an etalon, or a spectrally dispersive optic such as a prism or a grating coupled with spatial filtering, with their pass-band wavelength(s) located within the spectrum of the output radiation can be placed after the fiber to select and/or control the wavelength and spectral width of the spectrally broadened radiation for uses downstream. Thus, in an embodiment, there is provided a band-pass filter, at or downstream of the output of the optical fiber, to reduce and/or control the wavelength and spectral width of the output radiation. For example, the spectral width may be larger than desired and the band-pass filter can reduce the spectral width or select a certain spectral width of the output spectral width. In an embodiment, the band-pass filter is adjustable to provide different amounts of filtering and at different wavelengths. As an example of an adjustable filter, there may be provided an exchanger to put into the beam path a selected one of a plurality of filters, each filter specific to a different wavelength or amount of spectral width. The exchanger might be a rotating wheel that rotates different filters into the beam path. The radiation from output optics 507 is then provided to a target on, for example, substrate W for use in optical measuring.

In an embodiment, the optical fiber 505 is an optical fiber that has refractive index change across its cross-section. In an embodiment, the optical fiber 505 is a standard step-index or graded index optical fiber having, for example, a cylindrical cross-section. The optical fiber 505 may be a single mode fiber, a few mode fiber, or a multi-mode fiber. In an embodiment, the optical fiber 505 is a single mode, silica based optical fiber. In an embodiment, the optical fiber 505 has a refractive index that varies dependent on radiation intensity. In an embodiment, the optical fiber 505 may be made from one or more materials, for example, one or more materials selected from undoped or doped silica, fluorozirconate, fluoroaluminate, a chalcogenide glass, a plastic or any other material having a refractive index that varies dependent on radiation intensity. In an embodiment, the optical fiber 505 may comprise a photonic crystal, be structured and/or be a bandgap fiber. But, desirably, in an embodiment, the optical fiber 505 is not mainly a photonic crystal. But, desirably, in an embodiment, the optical fiber 505 is not primarily structured. But, desirably, in an embodiment, the optical fiber 505 is not bandgap optical fiber.

In an embodiment, the spectral broadening results in a spectral width of greater than 0.5 nm about the nominal wavelength. In an embodiment, the spectral broadening results in a spectral width of greater than 2 nm about the nominal wavelength. In an embodiment using a visible laser, the spectral width is relatively wide. In an embodiment, the spectral broadening results in a supercontinuum. In an embodiment, the supercontinuum has a spectral width of greater than or equal to about 350 nm, greater than or equal to 400 nm, greater than or equal to 500 nm, or greater than or equal to 900 nm about the nominal wavelength. In an embodiment, the supercontinuum has a spectral width of selected from the range of about 400 nm to 900 nm.

In an embodiment, the spectral width is symmetrical about the nominal wavelength. In an embodiment, the spectral width is asymmetrical about the nominal wavelength. In an embodiment, where the spectral width is asymmetrical, about 5% or less, about 10% or less, about 20% or less, about 30% or less, or about 40% or less of the spectral width is lower than the nominal wavelength.

Generally, the amount of spectral broadening is proportional to the length of the fiber 505 and is larger for shorter pulses, where the rate of intensity change in time is faster. Thus, different bandwidths and powers of the spectrally broadened visible (e.g., green) radiation generated in the system can be achieved by changing the power of the laser, the pulse width of the laser, the core size of the optical fiber and/or the length of the optical fiber. The spectral width of the output radiation can be increased with higher input pump power and/or longer fiber length.

The spectral width of the radiation system described herein may be reliably and easily modulated by, e.g., modulating one or more parameters of the input radiation source (e.g., the green laser). For example, spectral width may be increased by decreasing the pulse width (i.e., increasing the rate of change of intensity), or increasing the intensity of the input radiation or the spectral width may be decreased by increasing the pulse width (i.e., decreasing the rate of change of radiation intensity), or decreasing the intensity of the input radiation. Additionally or alternatively, the spectral width may be increased by increasing the length of the optical fiber through which the radiation is passed or increasing the nonlinear optical coefficient of the optical fiber, or decreased by decreasing the length of the optical fiber through which the radiation is passed or decreasing the electro optic coefficient of the optical fiber.

Figure 7:
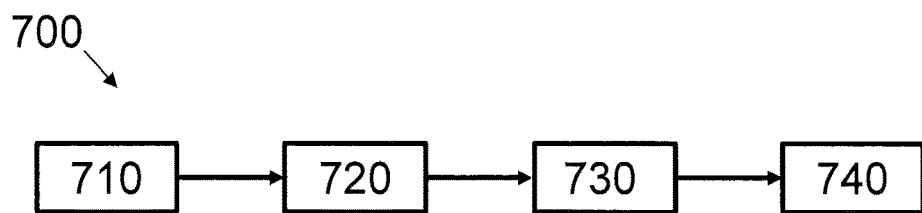
FIG. 7 schematically depicts a tunable wide spectral width radiation system.

As another example, FIG. 7 illustrates an example of a broadband tunable radiation system 700. In an embodiment, the system 700 comprises a broadband radiation source, such as an arc lamp or a supercontinuum source. In an embodiment, the system 700 comprises a fiber amplifier 710 and photonic crystal fiber 720. The system 700 uses supercontinuum generation that causes narrow-band radiation from a source radiation, such as fiber amplifier 710, to be converted to radiation with a continuous, broad and flat spectral bandwidth that has low temporal coherence while maintaining high spatial coherence of the source radiation. Spectral broadening may be accomplished by propagating optical pulses of radiation through a strongly nonlinear device, such as photonic crystal fiber 720. Photonic crystal fiber 720 has chromatic dispersion characteristics that allows for a strong nonlinear interaction over a significant length of fiber. A supercontinuum laser radiation system can be used as an illumination source that provides high spatial coherence and temporal coherence.

The system 700 may comprise, or be connected to, a tunable filter 730 (e.g., an acousto-optical-tunable-filter (AOTF)) and may comprise, or be connected to, a relay and mechanical interface 740. The tunable filter 730 enables selection of, for example, only a desired wavelength set point, typically up to a few or several nanometers wide. The filter 730 may be configured to block out-of-band wavelengths to a level that will have no adverse effect on a downstream optical module (e.g., an alignment system). The relay and mechanical interface 740 is configured to adjust a profile of the radiation beam emitted.

According to an embodiment, the emitted radiation can be tuned to specific narrow-band wavelengths over a continuous, flat and broad spectral range. This tunability allows the selection of wavelengths that fall in a spectral gaps that lies between, or falls outside of, conventional discrete wavelength set points. In an embodiment, the desired wavelength set point of the tunable filter can be dynamically set such that the desired wavelength set point matches the relatively narrow spectral band of, e.g., the alignment or other metrology mark. In this way, quick fine tuning by the alignment system can be provided, e.g., on the fly tuning.

A further description of the embodiment of FIG. 7 can be found in U.S. Pat. No. 8,508,736, which is incorporated herein in its entirety.

So, there may be provided a radiation system with a relatively broad spectral width around a nominal wavelength. The radiation system may be provided by coupling a visible laser outputting radiation in the visible region of the electromagnetic spectrum to an input end of an optical fiber and spectrally broadening the radiation in the optical fiber such that an output radiation at an output end of the optical fiber has a spectral width of at least 0.5 nm around a nominal wavelength of the visible output radiation from the laser. To achieve the spectral width of at least 0.5 nm around the nominal wavelength, a parameter of the laser and/or a parameter of the optical fiber may be modulated. For example, the length and/or core size of the optical fiber may be adjusted to provide the spectral width of the output radiation. Additionally or alternatively, a parameter of the laser, such as average power, peak power, pulse width, pulse separation, pulse repetition rate, or any combination selected therefrom, may be adjusted to provide the spectral width of the output radiation. In an embodiment, the spectral width is at least about 400 nm around the nominal wavelength.

Figure 8:
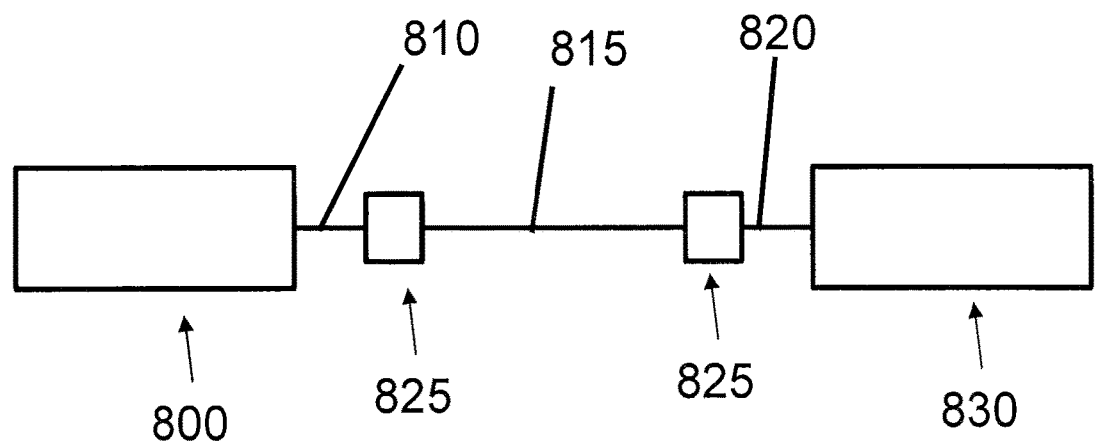
FIG. 8 schematically depicts example connections between a source and an optical module.

Referring to FIG. 8, there is schematically depicted how a radiation system may be optically coupled to another optical module. For example, a radiation system 800 (such as radiation system 104 of FIG. 5, radiation system 500 of FIG. 6, or radiation system 700 of FIG. 7) is optically coupled by optical fiber 810 to another optical fiber 815 by a connection 825 (which may be a fiber input coupler, a fiber output computer, a fiber splice, etc.). Further, optical fiber 820 is optically coupled to a further optical element 825 by a connection 825. The further optical element is part of, or optically coupled, to an optical module 830 (such as an inspection apparatus or other metrology apparatus described herein). The further optical element 825 may be an optical fiber. Similarly, optical fiber 810 and 815 need not be an optical fiber. So, more than one side of optical connection 825 need not be optical fiber. In an embodiment, more than one side of optical connection 825 is optical fiber. In an embodiment, all sides of optical connection 825 are optical fiber. In an embodiment, optical connection 825 may comprise a combination of optical fiber and a non-optical fiber optical component. And, while for sake of convenience, optical connections 825 are shown downstream of radiation system 800 and upstream of optical module 830, one or more optical connections 825 may be provided within radiation system 800 and/or within optical module 830. Further, there may be provided a single connection 825 between radiation system 800 and optical module 830.

It may be desirable to provide a connection 825 by which portions of optical fiber are at least optically coupled to each other or by which optical fiber is at least optically coupled to another component. In particular, it desirable to provide a connection that provides high coupling efficiency, stability and/or doesn't require special alignment.

In an embodiment, it may be desirable to enable to such a connection for optically coupling PCF to PCF, where, for example fiber 810 and 815 is PCF. The photonic crystal fiber (PCF) can enable delivery of single-mode illumination from radiation system 800 to optical module 830 (e.g., an alignment system as described herein).

To enable, for example, a connection that has high coupling efficiency, stability and/or doesn't require special alignment, there is provided a connection that employs evanescent coupling between optical components, in particular, in an embodiment, between portions of PCF. In an embodiment, there is provided a PCF having a lensed facet evanescently coupled with a PCF having a tapered facet to achieve high coupling efficiency (>90%) at one or more wavelengths selected from the range of 400-900 nm. By employing evanescent coupling, no physical contact may be required, in this PCF to PCF connection, between the respective PCF interfaces, thus, e.g., reducing risk of contamination damage and/or contact damage associated with physical contact between PCFs. Further, this connection is substantially less sensitive to alignment error than, for example, optical fiber optically coupled by one or more lenses between the PCFs.

Figure 9:
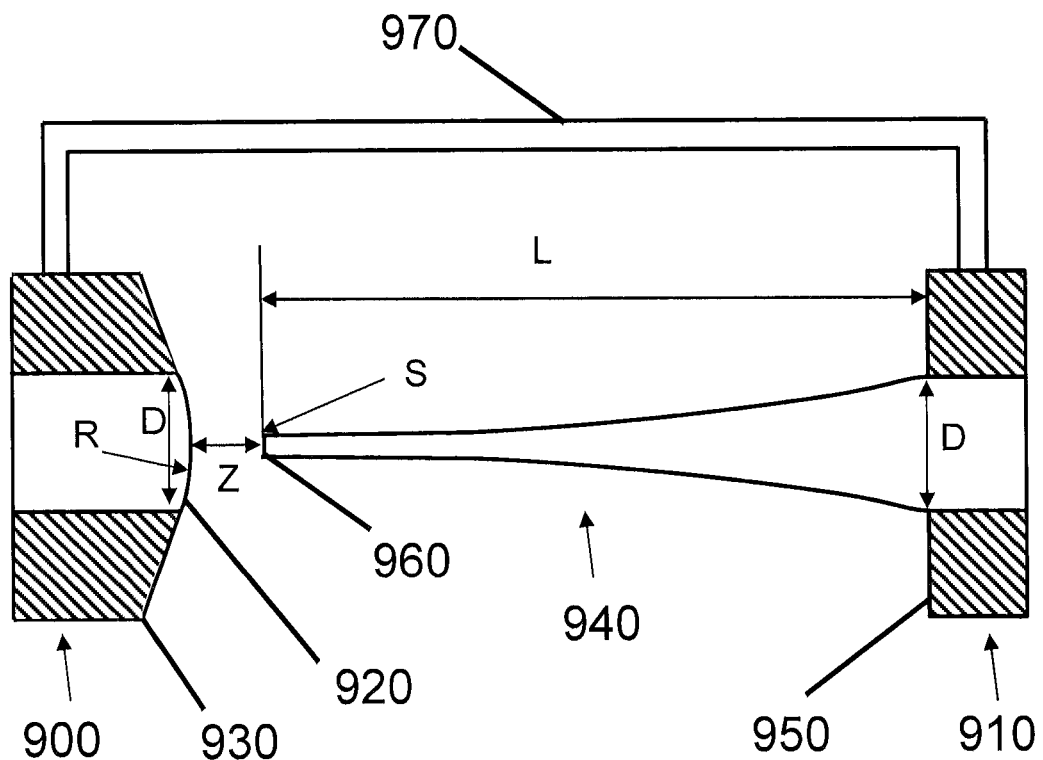
FIG. 9 schematically depicts an embodiment of a connection.

Referring to FIG. 9, a schematic diagram of an embodiment of a connection between portions of PCF 900 and PCF 910 is depicted. While PCF 900 and PCF 910 are shown as being of a same type, either PCF 900 or PCF 910 may be a different type of photonic crystal fiber than the other.

Figure 11:
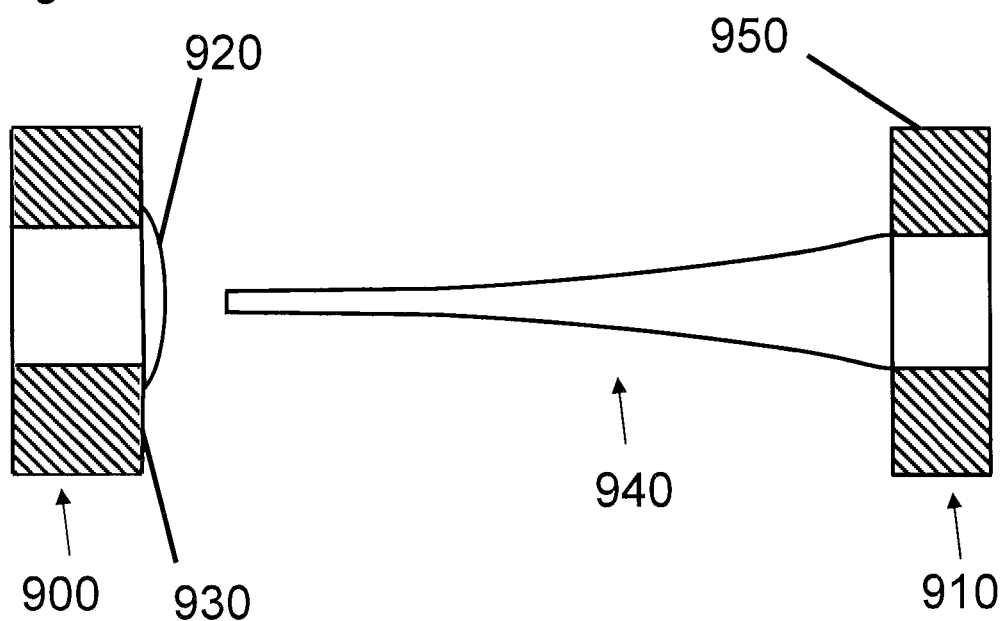
FIG. 11 schematically depicts a further embodiment of a connection.

PCF 900 comprises a lensed facet 920. In this embodiment, the lensed facet 920 is of the core of PCF 900. In an embodiment, the core is cylindrical but may another shape such as a prism (e.g., rectangular prism). In this embodiment, the core of PCF 900 is surrounded by a "cladding" layer 930, which as described may be, for example, a regular array of holes (filled with material of different refractive index than the material in which they are formed, e.g., an open hole with, e.g., air) around a "defect", such as a missing open hole in the array, that forms the core. In an embodiment, the layer 930 may have an incline of its facet face extending from the lensed facet toward its outer surface as shown in FIG. 9. As shown in FIG. 11, the layer 930 may have a flat facet face, i.e., about 90 degrees to the optical axis of PCF 900.

The lensed facet 920 may have one or more radiuses R defining the outer surface of the lensed facet 920. In an embodiment, the radius R is greater than 0 and less than or equal to about 50 microns. The lensed facet can be made by etching (e.g., a chemical etch), a thermal process, a polishing process, lithography (e.g., using a resist and radiation exposure of the resist), or a combination selected therefrom. In an embodiment, the core may be selectively processed separate from the "cladding" layer to form the lensed facet using, e.g., a mask. In an embodiment, the lensed facet 920 has a base with a cross-wise dimension D (e.g., width or diameter where the base is circular). In an embodiment, the base has a same cross-wise dimension as the core of PCF 900, particularly, for example, where the lensed facet 920 is integral with the core of PCF 900. In an embodiment, cross-wise dimension D (e.g., diameter) has a range of 2-20 microns, which may be the same as the cross-wise dimension of the core of PCF 900.

PCF 910 comprises a tapered facet 940. In this embodiment, the tapered facet 940 is of the core of PCF 910. In this embodiment, the core of PCF 910 is surrounded by a "cladding" layer 950, which as described may be, for example, a regular array of holes (filled with material of different refractive index than the material in which they are formed, e.g., an open hole with, e.g., air) around a "defect", such as a missing open hole in the array, that forms the core.

As shown in FIG. 9, the layer 950 may have a flat facet face, i.e., about 90 degrees to the optical axis of PCF 910. In an embodiment, the layer 950 may have an incline of its facet face extending from the lensed facet toward its outer surface similar to as shown for layer 930 in FIG. 9.

The tapered facet 940 may have a length L. In an embodiment, the length L is greater than 0 and less than or equal to about 100 microns. The tapered facet 940 has a facet 960 at its end toward the lensed facet 920. The facet 960 may be flat or curved. In an embodiment, the tapered facet 940 may have a circular periphery and thus form a cone-type structure. In that case, the facet 960 may have a circular periphery (but could be shaped with a different periphery). In an embodiment, the tapered facet 940 may have a rectangular periphery and thus form a pyramid-type structure. In that case, the facet 960 may have a rectangular periphery (but could be shaped with a different periphery). In an embodiment, the tapered facet 940 may have a different periphery shape including a periphery shape that varies (e.g., continuously) between one end to another end. As noted above, the tapered facet 940 and the facet 960 may have different periphery shapes. The tapered facet can be made by etching (e.g., a chemical etch), a thermal process, a polishing process, lithography (e.g., using a resist and radiation exposure of the resist), or a combination selected therefrom. In an embodiment, the core may be selectively processed separate from the "cladding" layer to create the tapered facet using, e.g., a mask.

The open gap (e.g., an air gap) between the lensed facet 920 and the facet 960 of the tapered facet 940 may be distance Z. In an embodiment, the distance Z is greater than 0 and less than or equal to about 100 microns. Thus, in this embodiment, the radiation propagates from the lensed facet 930 of PCF 900 across the gap distance Z into the tapered facet 940 of the PCF 910. The focused optical field from the lensed facet 920 matches the shape of the localized evanescent wave, which is induced by the taper facet 960. Therefore, the radiation field transmits into and through the facet 960 of the tapered facet 940 by evanescent coupling. The wave propagation inside the structure of the tapered facet 940 is confined within the taper by total internal reflection.

To achieve high coupling efficiency, the facet 960 of the tapered facet 940 should be located at or near the focus position of the lensed facet 930. In an embodiment, the cross-wise dimension S (e.g., width or diameter where the facet 960 is circular) of facet 960 of the tapered facet 940 is greater than or equal to 0 and less than or equal to about 100 nm in order to obtain high coupling efficiency. In an embodiment, the facet 960 has an area greater than or equal to 0 and less than or equal to about 10,000 $nm^2$. In an embodiment, the facet 960 has a perimeter greater than or equal to 0 and less than or equal to about 400 nm. The shape of the taper of the external surface of the tapered facet 940 can be a hyperbolic taper, an exponential taper, a parabolic taper and/or a linear taper. The taper shape may not affect coupling efficiency significantly.

In an embodiment, the tapered facet 940 has a base with a cross-wise dimension D (e.g., width or diameter where the base is circular). In an embodiment, the base has a same cross-wise dimension as the core of PCF 910, particularly, for example, where the tapered facet 940 is integral with the core of PCF 910. In an embodiment, cross-wise dimension D (e.g., diameter) has a range of 2-20 microns, which may be the same as the cross-wise dimension of the core of PCF 910. In an embodiment, the tapered facet has an aspect ratio L/D in the range of range of 5-10. In an embodiment, the tapered facet has an aspect ratio L/S in the range of range of 500-1000.

To provide and keep the gap between the lensed facet 920 and facet 960, there is provided a structure 970 to keep the lensed facet 920 and facet 960 spaced apart from each other. The structure 970 may be, for example, a sleeve, another "cladding" layer, one or more frames to separately hold the PCF 900, 910, etc.

To be sure, PCF 900 and PCF 910 are not shown to scale and portions have been omitted to aid clarity of description. For example, the "cladding" layers 930 and 950 would typically be significantly proportionally thicker than shown. As another example, PCF 900 and PCF 910 would have much longer lengths than as shown.

Figure 10A:
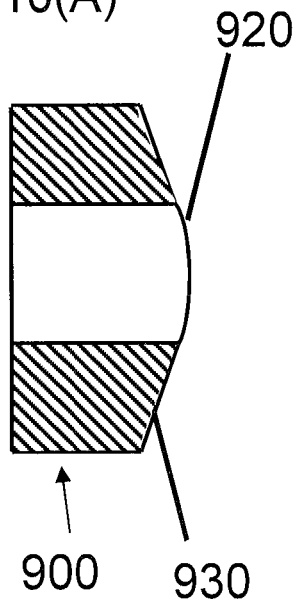
FIG. 10(A) schematically depicts a detailed portion of an embodiment of a connection.
Figure 10B:
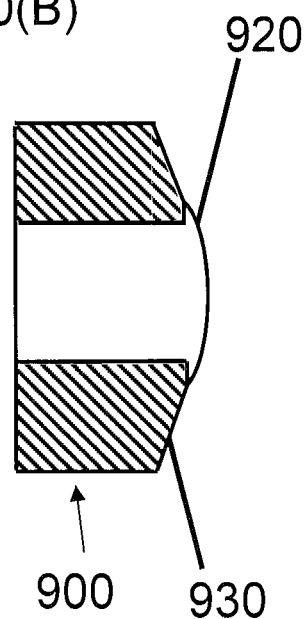
FIG. 10(B) schematically depicts a detailed portion of an embodiment of a connection.

Referring to FIG. 10, the lensed facet 920 may have different configurations. Referring to FIG. 10(A), the maximum lens radius R is limited by a cross-wise dimension (e.g., radius) of the core of PCF 900, e.g., the lens radius R is less than or equal to the radius of the core of PCF 900 from its optical axis. This lensed facet 920 configuration is the same as shown in FIG. 9. In FIG. 10(*b*), the lens is larger than a cross-wise dimension (e.g., radius) of the core of PCT 900. That is, the lens radius R is greater than the radius of the core of PCF 900. This may be accomplished by, e.g., growing, expanding or flattening a portion of the core at the end (i.e., to "flare" the end) and which is then processed as discussed above to provide the lensed facet 920. Optionally, the core of PCF 900 may be initially constructed to have a wider portion, which is then used to make the lensed facet 920 by processing as described above. Both configurations can achieve high coupling efficiency with appropriate tapered facet 940.

Referring to FIG. 11, examples of a separate lensed facet 920 and a separate tapered facet 940 are depicted; the structure 970 is omitted for convenience. In an embodiment, either a separate lensed facet 920 or a separate tapered facet 940 may be provided. The other of the facet 920 or 940 may be integrally formed as described above and depicted in, e.g., FIG. 9. In an embodiment, the separate lensed facet 920 and separate tapered facet 940 has a same or similar refractive index (e.g., made of the same material) as the respective optical component to which it is attached (e.g., the core of PCF). The separate lensed facet 920 and separate tapered facet 940 may be, e.g., glued, thermally bonded, etc. to its respective optical component to which it is attached (e.g., the core of PCF). In an embodiment, a bonding material has a same or similar refractive index as its respective separate lensed facet 920 and separate tapered facet 940 and respective optical component to which separate lensed facet 920 and separate tapered facet 940 is attached. In an embodiment, the separate lensed facet 920 may have a cross-wise dimension larger than that of the core of PCF 900, which may, for example, facilitate manufacture.

So, in an embodiment, there is provided an alignment (or other metrology) sensor that comprises one or more connections as described herein to enable delivery of, e.g., single mode illumination from a radiation source to one or more optical modules of the sensor. In an embodiment, the sensor may operate using one or more illumination wavelengths selected from the range of about 400 nm-900 nm and thus the connection may transmit one or more wavelengths selected from the same range. In an embodiment, one or more of the connections of the alignment (or other metrology) sensor comprises photonic crystal fiber (PCF) and so, in an embodiment, the connection is a PCF to PCF connection. In an embodiment, the connection may be part of a telecommunication system or device wherein analog or digital data is encoded in the radiation transmitted via the connection. The connection may be part of an optical communications transmitter, may connect an optical communications transmitter to another part of an optical communications system, may be part of an optical communications receiver, may connect an optical communications receiver to another part of an optical communications system, may be part of optical communications channel, may connect an optical communications channel to another part of an optical communications system, may be part of an optical communications amplifier, repeater or router, or may connect an optical communications amplifier, repeater or router to another part of an optical communications system. For an optical communications system, the system may operate using one or more wavelengths selected from the range of about 700 nm-2300 nm, e.g., 800 nm-1800 nm, e.g., 1200 nm-1600 nm, and thus the connection may transmit one or more wavelengths in those ranges.

"Visible" or "green" as used herein refers to the electromagnetic spectrum color or color range corresponding to the wavelength of radiation emitted by the laser. Thus, a green laser may refer to a laser having a nominal wavelength selected from the range of about 495 nm to about 570 nm. In certain embodiments, as shown in FIG. 6, the green laser may have a wavelength of about 532 nm. In other embodiments, the green laser may have a wavelength of about 515 nm or about 520 nm. A visible laser may refer to a laser having a nominal wavelength selected from the range of about 390 nm to about 700 nm.

In an embodiment, there is provide a system comprising a first component and a second component that are optically coupled, wherein: the first component has a lensed facet, the second component has a tapered facet, the lensed facet and the tapered facet are spaced apart from one another, and the lensed facet and the tapered facet are operative to establish an evanescent-wave coupling between the first component and the second component.

In an embodiment, there is provided a connection of optical components, the connection comprising: a first optical component comprising a lensed facet; and a second optical component comprising a tapered structure, the tapered structure spaced from the lensed facet to enable evanescent coupling.

In an embodiment, there is provided a system, comprising: a first component comprising a lensed facet; and a second component optically coupled to the first component, the second component comprising a tapered facet, the tapered facet and lensed facet spaced from each other so as to establish evanescent-wave coupling between the first component and the second component.

In an embodiment, the first optical component and/or the second optical component comprises optical fiber. In an embodiment, the first optical component and/or the second optical component comprises photonic-crystal fiber. In an embodiment, the first optical component and the second optical component comprises photonic-crystal fiber. In an embodiment, a lens radius of the lensed facet is less than or equal to a distance from the center of the core of the fiber to the core's exterior periphery. In an embodiment, a lens radius of the lensed facet is greater than a distance from the center of the core of the fiber to the core's exterior periphery. In an embodiment, the fiber is a single-mode fiber. In an embodiment, a front facet of the tapered facet is located at about the focus position of the lensed facet. In an embodiment, a front facet size of the tapered facet is greater than or equal to 0 and less than or equal to about 100 nm. In an embodiment, the lensed facet is a separate structure from the first optical component that is attached to the first optical component. In an embodiment, the lensed facet is integral of the first optical component. In an embodiment, the tapered facet is a separate structure from the second optical component that is attached to the second optical component. In an embodiment, the tapered facet is integral of the second optical component. In an embodiment, the spectral width of the radiation through the connection is about 400 nm or more. In an embodiment, the radiation through the connection is in the range of about 500-900 nm. In an embodiment, wave propagation inside the tapered facet is confined within the taper by total internal reflection. In an embodiment, a gap between the lensed facet and the tapered facet is greater than 0 and less or equal to about 100 microns. In an embodiment, a length of the tapered facet is greater than 0 and less or equal to about 100 microns. In an embodiment, a periphery of the lensed facet and of the tapered facet is circular.

In an embodiment, there is provided a spectrally broadened radiation apparatus, comprising: a laser configured to emit, through an output of the laser, radiation; an optical fiber optically coupled to the output of the laser, the optical fiber having an input to receive the radiation from the laser and having an output to provide spectrally broadened output radiation, the optical fiber configured to spectrally broaden the radiation from the laser to a spectral width of at least 0.5 nm around the nominal wavelength; and a system to enable coupling as described herein.

In an embodiment, there is provided an inspection apparatus, comprising: a radiation apparatus configured to provide radiation; an output to provide the radiation from the radiation apparatus onto a diffraction target; a detector configured to receive diffracted radiation from the target; and a system to enable coupling as described herein.

In an embodiment, the detector is configured to determine alignment of two or more objects responsive to the received diffracted radiation.

In an embodiment, there is provided an alignment sensor, comprising: an output to provide the radiation from the radiation apparatus onto a target; a detector configured to receive radiation from the target; a control system configured to determine alignment of two or more objects responsive to the received radiation; and a system to enable coupling as described herein.

In an embodiment, there is provided a communications device configured to transmit radiation encoded with a digital or analog data, the communication device comprising a system of coupling as described herein.

In an embodiment, there is provided a method of optically coupling optical components, the method comprising: propagating evanescent waves of radiation across a gap between a lensed facet of a first optical component and a tapered facet of a second optical component.

In an embodiment, the first optical component and/or the second optical component comprises optical fiber. In an embodiment, the first optical component and/or the second optical component comprises photonic-crystal fiber. In an embodiment, the first optical component and the second optical component comprises photonic-crystal fiber. In an embodiment, a front facet of the tapered facet is located at about the focus position of the lensed facet. In an embodiment, a front facet size of the tapered facet is greater than or equal to 0 and less than or equal to about 100 nm. In an embodiment, the spectral width of the radiation through the connection is about 400 nm or more. In an embodiment, the radiation through the connection is in the range of about 500-900 nm. In an embodiment, the radiation through the connection is in the range of about 800-1800 nm. In an embodiment, a gap between the lensed facet and the tapered facet is greater than 0 and less or equal to about 100 microns. In an embodiment, a length of the tapered facet is greater than 0 and less or equal to about 100 microns. In an embodiment, a periphery of the lensed facet and of the tapered facet is circular. In an embodiment, the method further comprises providing the radiation onto a diffraction target and receiving diffracted radiation from the target at a detector. In an embodiment, the method further comprises determining alignment of two or more objects responsive to the received diffracted radiation at the detector. In an embodiment, the radiation is encoded with digital or analog data.

An embodiment of the invention may take the form of a computer program containing one or more sequences of machine-readable instructions describing a method as disclosed herein, or a data storage medium (e.g. semiconductor memory, magnetic or optical disk) having such a computer program stored therein. Further, the machine readable instruction may be embodied in two or more computer programs. The two or more computer programs may be stored on one or more different memories and/or data storage media.

Any controllers described herein may each or in combination be operable when the one or more computer programs are read by one or more computer processors located within at least one component of the lithographic apparatus. The controllers may each or in combination have any suitable configuration for receiving, processing, and sending signals. One or more processors are configured to communicate with the at least one of the controllers. For example, each controller may include one or more processors for executing the computer programs that include machine-readable instructions for the methods described above. The controllers may include data storage medium for storing such computer programs, and/or hardware to receive such medium. So the controller(s) may operate according the machine readable instructions of one or more computer programs.

Although specific reference may have been made above to the use of embodiments in the context of optical lithography, it will be appreciated that an embodiment of the invention may be used in other applications, for example imprint lithography, and where the context allows, is not limited to optical lithography. In imprint lithography, a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

Further, although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

The terms "radiation" and "beam" used herein encompass all types of electromagnetic radiation, including near infrared radiation (e.g., radiation having a wavelength in the range of about 700 nm to about 1400 nm), visible radiation (e.g., radiation having a wavelength in the range of about 390 nm to 700 nm, e.g., about 633 nm or in the range of about 495 nm to about 570 nm, e.g., about 515 nm, about 520 nm, or about 532 nm), ultraviolet (UV) radiation (e.g. having a wavelength of or about 365, 355, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

The descriptions above are intended to be illustrative, not limiting. Thus, it will be apparent to one skilled in the art that modifications may be made to the invention as described without departing from the scope of the claims set out below. For example, one or more aspects of one or more embodiments may be combined with or substituted for one or more aspects of one or more other embodiments as appropriate. Therefore, such adaptations and modifications are intended to be within the meaning and range of equivalents of the disclosed embodiments, based on the teaching and guidance presented herein. It is to be understood that the phraseology or terminology herein is for the purpose of description by example, and not of limitation, such that the terminology or phraseology of the present specification is to be interpreted by the skilled artisan in light of the teachings and guidance. The breadth and scope of the invention should not be limited by any of the above-described exemplary embodiments, but should be defined only in accordance with the following claims and their equivalents.

What is claimed is:

1. A system, comprising:
   a first component comprising a lensed facet, the lensed facet configured to converge radiation toward a focus; and
   a second component, optically coupled to the first component, to receive the converging or converged radiation from the first component, the second component comprising a tapered facet, the tapered facet and lensed facet spaced from each other by a gap of less than or equal to about 100 microns so as to establish evanescent-wave coupling between the first component and the second component.

2. The system of claim 1, wherein the first optical component and/or the second optical component comprises optical fiber.

3. The system of claim 2, wherein the first optical component and/or the second optical component comprises photonic-crystal fiber.

4. The system of claim 2, wherein the fiber is a single-mode fiber.

5. The system of claim 1, wherein a front facet of the tapered facet is located at about the focus position of the lensed facet.

6. The system of claim 1, wherein a front facet size of the tapered facet is greater than or equal to 0 and less than or equal to about 100 nm.

7. The system of claim 1, wherein the lensed facet is a separate structure from the first optical component that is attached to the first optical component.

8. The system of claim 1, wherein the tapered facet is a separate structure from the second optical component that is attached to the second optical component.

9. The system of claim 1, wherein the spectral width of the radiation through the first and second components is about 400 nm or more.

10. The system of claim 1, wherein a length of the tapered facet is greater than 0 and less or equal to about 100 microns.

11. A spectrally broadened radiation apparatus, comprising:
    a laser configured to emit, through an output of the laser, radiation;
    an optical fiber optically coupled to the output of the laser, the optical fiber having an input to receive the radiation from the laser and having an output to provide spectrally broadened output radiation, the optical fiber configured to spectrally broaden the radiation from the laser to a spectral width of at least 0.5 nm around the nominal wavelength; and
    the system of claim 1.

12. An inspection apparatus, comprising:
    a radiation apparatus configured to provide radiation;
    an output to provide the radiation from the radiation apparatus onto a diffraction target;
    a detector configured to receive diffracted radiation from the target; and
    the system of claim 1.

13. The inspection apparatus of claim 12, wherein the detector is configured to determine alignment of two or more objects responsive to the received diffracted radiation.

14. A communications device configured to transmit radiation encoded with a digital or analog data, the communication device comprising the system of claim 1.

15. A method of optically coupling optical components, the method comprising:
    propagating evanescent waves of radiation across a gap of less than or equal to about 100 microns from a lensed facet of a first optical component toward a tapered facet of a second optical component, wherein the lensed facet converges the radiation toward a focus and the second component receives the converging or converged radiation.

16. The method of claim 15, wherein the first optical component and/or the second optical component comprises optical fiber.

17. The method of claim 16, wherein the first optical component and/or the second optical component comprises photonic-crystal fiber.

18. The method of claim 15, wherein a front facet of the tapered facet is located at about the focus position of the lensed facet.

19. The method of any of claim 15, wherein a front facet size of the tapered facet is greater than or equal to 0 and less than or equal to about 100 nm.

20. The method of claim 15, wherein a length of the tapered facet is greater than 0 and less or equal to about 100 microns.

21. A system, comprising:
    a first component comprising a lensed facet, the lensed facet configured to converge radiation toward a focus; and a second component, optically coupled to the first component, to receive the converging or converged radiation from the first component, the second component comprising a tapered facet, the tapered facet and lensed facet spaced from each other by an open gas gap of less than or equal to about 100 microns so as to establish evanescent-wave coupling between the first component and the second component in the open gas gap.

22. The system of claim 21, wherein the first optical component and/or the second optical component comprises photonic-crystal fiber.

23. The system of claim 21, wherein the first optical component and/or the second optical component comprises a single-mode fiber.

* * * * *